US008887200B2

(12) United States Patent
Cahnbley et al.

(10) Patent No.: US 8,887,200 B2
(45) Date of Patent: Nov. 11, 2014

(54) SMART CATCH-UP FOR MEDIA CONTENT VIEWING

(75) Inventors: Jens Cahnbley, Princeton Junction, NJ (US); Shemimon Manalikudy Anthru, Dayton, NJ (US); David Anthony Campana, Princeton, NJ (US); David Brian Anderson, Florence, NJ (US); Ishan Mandrekar, Monmouth Junction, NJ (US)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 13/579,049
(22) PCT Filed: Dec. 10, 2010
(86) PCT No.: PCT/US2010/003143
§ 371 (c)(1), (2), (4) Date: Aug. 15, 2012
(87) PCT Pub. No.: WO2011/102827
PCT Pub. Date: Aug. 25, 2011

(65) Prior Publication Data
US 2012/0311640 A1    Dec. 6, 2012

Related U.S. Application Data

(60) Provisional application No. 61/306,190, filed on Feb. 19, 2010.

(51) Int. Cl.
H04N 5/445     (2011.01)
H04N 21/41     (2011.01)
H04H 60/72     (2008.01)
H04N 7/16      (2011.01)
H04N 21/422    (2011.01)
H04N 21/466    (2011.01)
H04N 21/485    (2011.01)
H04N 21/433    (2011.01)
H04H 60/65     (2008.01)

(52) U.S. Cl.
CPC ........... *H04N 7/163* (2013.01); *H04N 21/4122* (2013.01); *H04N 5/44513* (2013.01); *H04H 60/72* (2013.01); *H04N 21/42204* (2013.01); *H04N 21/4668* (2013.01); *H04N 21/485* (2013.01); *H04N 21/4331* (2013.01); *H04H 60/65* (2013.01)
USPC .............................................. 725/39; 725/51

(58) Field of Classification Search
USPC ..................................................... 725/51, 39
See application file for complete search history.

(56) References Cited

U.S. PATENT DOCUMENTS 6,025,837 A * 2/2000 Matthews et al. ............. 715/721
6,130,726 A * 10/2000 Darbee et al. ................ 348/734

(Continued)

FOREIGN PATENT DOCUMENTS

CN     101420571    4/2009
EP     2015580      1/2009

(Continued)

*Primary Examiner* — Pankaj Kumar
*Assistant Examiner* — Timothy Newlin
(74) *Attorney, Agent, or Firm* — Robert D. Shedd; Jerome G. Schaefer

(57) ABSTRACT

A method and system of providing access to related content includes a primary display that is tuned to a desired program. Information that identifies the desired program is retrieved from an electronic program guide using a content processor. A plurality of locations on a communication network are automatically searched for additional episodes of the desired program using the retrieved information via an interne interface. Links for accessing the additional episodes of the tune program are provided via a user interface display processor on a secondary display.

14 Claims, 6 Drawing Sheets

(56) References Cited

U.S. PATENT DOCUMENTS

| | | | |
|---|---|---|---|
| 7,073,189 B2 * | 7/2006 | McElhatten et al. | 725/58 |
| 8,453,189 B2 * | 5/2013 | Agnihotri et al. | 725/113 |
| 8,533,761 B1 * | 9/2013 | Sahami et al. | 725/53 |
| 2002/0174430 A1 * | 11/2002 | Ellis et al. | 725/46 |
| 2005/0120370 A1 | 6/2005 | Behbehani | 725/45 |
| 2005/0160461 A1 | 7/2005 | Baumgartner et al. | |
| 2005/0198670 A1 * | 9/2005 | Nishimoto | 725/58 |
| 2005/0235316 A1 * | 10/2005 | Ahmad-Taylor | 725/44 |
| 2007/0154163 A1 * | 7/2007 | Cordray | 386/52 |
| 2007/0157237 A1 | 7/2007 | Cordray et al. | |
| 2007/0157249 A1 | 7/2007 | Cordray et al. | |
| 2008/0189741 A1 * | 8/2008 | Choe | 725/39 |
| 2008/0270449 A1 | 10/2008 | Gossweiler et al. | |
| 2009/0100466 A1 * | 4/2009 | Migos | 725/40 |
| 2009/0178083 A1 * | 7/2009 | White et al. | 725/61 |
| 2009/0249409 A1 * | 10/2009 | Bhogal et al. | 725/86 |
| 2011/0106744 A1 * | 5/2011 | Becker et al. | 706/46 |

FOREIGN PATENT DOCUMENTS

| | | |
|---|---|---|
| EP | 2242259 | 10/2010 |
| GB | 2443959 | 5/2008 |
| JP | 2010056595 | 3/2010 |
| WO | WO2007078623 | 7/2007 |

* cited by examiner

SMART CATCH-UP FOR MEDIA CONTENT VIEWING

CROSS-REFERENCE TO RELATED APPLICATIONS

This application claims the benefit, under 35, U.S.C.§365, of International Application PCT/US10/003143, filed Dec. 10, 2010, which was published in accordance with PCT Article 21(2) on Aug. 25, 2011, in English and which claims the benefit of United States provisional patent application No. 61/306190, filed Feb. 19, 2010.

FIELD

The present arrangement provides a system and method that automatically searches and retrieves information from at least one source associated with content selected by a user.

BACKGROUND

With the increasing number of media content series (e.g. television series) available to a individuals, it is increasingly likely that a user may not hear of a series until after the first episodes or even seasons have been aired. Thus, a problem arises when a user is accessing a later episode of a media content series and the user has missed previous episodes that may be important to fully enjoy the currently accessed content. This problem is exacerbated by the number of media providers and media outlets that create and distribute content to users. Moreover, the sheer number of series available, and the busy schedule of today's society makes it harder see each episode of content.

One solution to the aforementioned problems is the increasing popularity of personal video recorders (PVR's such as TiVo or similar services offered through a cable/satellite provider subscription). PVR's allow the user to watch content at times that comport with their schedule. However, the use of PVR's does not solve the problem of accessing content after the content is aired or when a later episode is being aired. Another limitation associated with a PVR is that the user has to be aware of the series content ahead of time in order to schedule a recording of the series content. Using a PVR also does not solve the problem of getting up to date with series content that is already in progress.

Currently, a user must actively search for episodes through content providing services (e.g. OnDemand, Fancast, Netflix, Hulu, etc) and browse through and access any available episode content. However, this is daunting and tiring task and may not produce a desirable experience to the user because the content may only be accessible on a device that is not the primary content access device. For example, the manual searching of a content provider website for previously aired episodes of particular television program may result in these episodes only being accessible on a computer rather than a television. This may not be acceptable to certain viewers because of the screen size and the lack of familiarity accessing television content using a computer.

Therefore, a need exists to provide a system that automatically acquires past episodes of content associated with a currently accessed piece of content thereby providing the user with all the necessary information to enjoy the currently accessed content.

SUMMARY

In one embodiment, a method of providing access to related content is described as follows. A display is tuned to a desired program and information that identifies the desired program is retrieved from an electronic program guide using a content processor. A plurality of locations on a communication network are automatically searched via an internet interface for additional episodes of the desired program using the retrieved information. Links for accessing the additional episodes of the tune program are provided via a user interface display processor.

In another embodiment, a system for providing access to related content is described as follows. A tuner tunes a display to a desired program. A content processor coupled to the tuner retrieves information identifying the desired program from an electronic program guide. An internet interface automatically searches locations on a communication network for additional episodes of the desired program using the retrieved information and a user interface display processor provides links enabling a user to access the additional episodes of the tuned program.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter can be employed, and the subject matter is intended to include all such aspects and their equivalents. Other advantages and novel features of the subject matter can become apparent from the following detailed description when considered in conjunction with the drawings.

DETAILED DESCRIPTION

Figure 1:
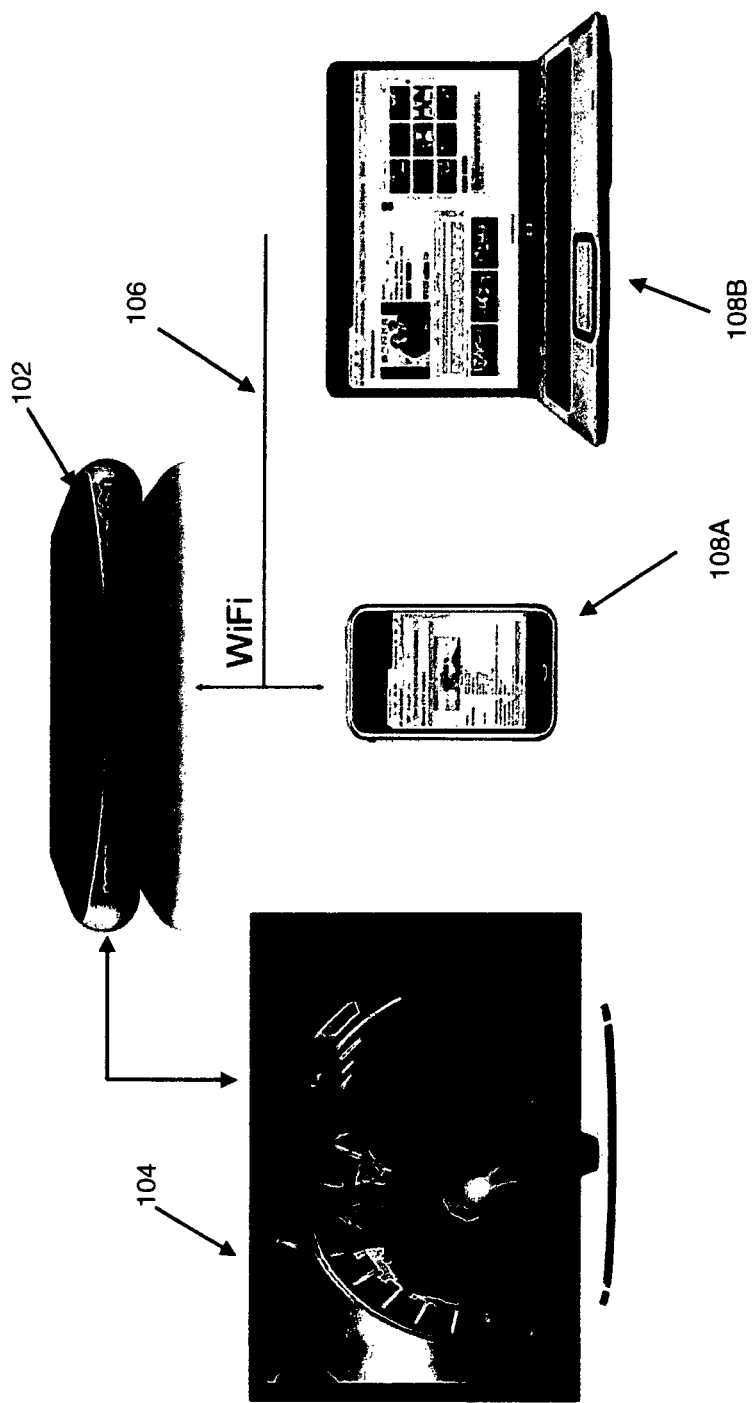
FIG. 1 is an example of a set top box system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

In other instances, well-known structures and devices are shown in block diagram form in order to facilitate describing the embodiments.

As used in this application, the term "component" is intended to refer to hardware, or a combination of hardware and software in execution. For example, a component can be, but is not limited to being, a process running on a processor, a processor, an object, or an executable running on a processor, and/or a microchip and the like. By way of illustration, both an application running on a processor and the processor can be a component. One or more components can reside within a process and a component can be localized on one system and/or distributed between two or more systems. Functions of the various components shown in the figures can be provided through the use of dedicated hardware as well as hardware capable of executing software in association with appropriate software.

When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting instances and embodiments of the invention are intended to encompass both structural and functional equivalents. Additionally, it is intended that such equivalents include both currently known equivalents as well as equivalents developed in the future (i.e., any elements developed that perform the same function, regardless of structure)

The system advantageously enables users to access primary content in a plurality of different formats and automatically be presented with a set related content that is available to the user which provides the user with information that is relevant to the content being accessed. Primary content may include any audio, video or audiovisual data representing a respective episode in a series of episodes and which is stored or broadcasted in a manner that is accessible by the system for delivery to a user. The primary content may include, but is not limited to, (a) a broadcast television program, (b) a television program that is delivered via an on-demand subscription, (c) a television program that is stored on a storage medium that is selectively accessible by the system, (d) a terrestrial or satellite radio broadcast, (e) an audio program delivered via an on-demand service (f) audio program stored on a storage medium that is selectively accessible by the system (i.e. a network storage device) and (g) a sporting event. Related content may include any audio, video or audiovisual data representing a respective episode in a series of episodes that is at least one of earlier or later in the series than the primary content and which is stored or broadcasted in a manner that is accessible by the system for delivery to a user. The system automatically searches for and acquires data to be included as part of the set of related content using characteristic data associated with the primary content to search for and acquire the related content.

In one embodiment, the primary content may include a third episode of a television series wherein the first and second episodes had been previously broadcast. Should the user accessing the third episode find it interesting, it would be desirable for the previously broadcasted episodes to be acquired and presented to the user. In response to determining that a user has an interest in the primary content, the system automatically searches for and acquires data representing the previous episodes one and two from at least one content provider source.

The system advantageously enables the user to immediately access the data representing the previous episodes in the series by presenting the user with a list including user-selectable image elements corresponding to the acquired data. This list can be presented on a primary and/or a secondary screen and allows a user to understand if and how they are able to immediately watch a previous episode. In response to a control signal generated by a user that indicates the user wishes to access a previous episode, the system automatically accesses and displays the selected previous episode on the primary display device and causes the primary content to be recorded on a storage medium (e.g. PVR). Additionally, the system may automatically schedule a recording for any subsequent episodes of the primary content using a PVR scheduling application.

In another embodiment, the system may determine and apply related content indicators that include information about the related content. The related content indicators may be displayed in conjunction with the list of acquired related content. Exemplary information about the related content may include at least one of (a) data identifying an access level required for a user to access the related content; (b) data identifying whether or not a user will have full access to the related content; (c) data representing at least one type of device on which the related content can be accessed; (d) data indicating that the content is free or part of a subscription arrangement; and (e) data providing a user with information on how to obtain full access to the related content.

In a further embodiment, the acquired related data may also include a set of ancillary data associated therewith that is presentable to the user. Ancillary data may include at least one of (a) episode description data; (b) series description data; (c) series preview data; and (d) series participant data.

One exemplary embodiment of the system is shown in FIG. 1 which includes a set top box 102, for example a cable television set top box, including a tuner module that selectively tunes an input signal from a cable/satellite provider. The set top box 102 is coupled to a primary display device 104, for example a high definition television monitor, which selectively displays content corresponding to the signal tuned by the tuner module in the set top box 102. While a set top box 102 is described as the access point enabling selection and viewing of content, it should be noted that any device including at least one tuner module enabling selection of content as primary content may be used to implement the present system. Alternatively, the system may be implemented by any device that allows any piece of content to be selected and provided to a user in any manner.

Set top box 102 may include a central processing unit (controller), memory and storage medium. The components that make up an exemplary set top box 102 are also described below with respect to FIG. 5. Set top box 102 may also include dedicated circuits that are programmed to perform a specific function or task by executing software applications that are at least one of coded directly into the circuit or stored on a non-transient computer readable medium. For example, set top box 102 executes a web server application that enables web based devices to connect to the set top box 102 using a simple web browser. At least one secondary display device is coupled to the set top box 102 via communication network 106 such as a local area wifi network. As shown in FIG. 1, exemplary secondary display devices include a smartphone 108A and/or a laptop 108B. Smartphone 108A and laptop 108B are able to execute a web browser application and point the web browsing application at an address corresponding to the set top box 102 for obtaining access thereto. The secondary display device may be any computing device that has access to at least one of a local area network and wide area network and which can access and receive data representing the related content from the set top box 102 for display thereon. Secondary display device may be any of at least but is not limited to, a computer, a laptop, a netbook, a tablet computer, a cellular phone, a smart phone or a second monitor different from the primary display device 104.

The set top box 102 is controlled by a user or other device (e.g. a VCR, a DVR, another tuner, etc) in a known manner, for example using a remote control (not shown), to cause the set top box 102 (or primary display device 104) to tune a particular piece of content representing an episode of a series that may be displayed on primary display device 104. The episode content selected by the user includes ancillary data such as program guide data and other information that describe the content currently selected by the set top box 102. Program guide data and any other data identifying and/or describing the currently tuned content are parsable by the system for use in identifying the series to which the episode belongs as well as a number of previous and/or subsequent episodes of the series available to be accessed by a user. As an example, characteristic data describing the currently selected episode content that may be displayed as part of the electronic program guide include (a) program title, (b) actors appearing in program, (c) data of original airing, (d) episode title data, (e) series data, (f) plot synopsis data and (g) data describing topics/situations shown in the currently viewed content. The data describing the currently viewed content is described for purposes of example only and any type of data as determined by the content provider may be incorporated and used by the system. The system uses characteristic data associated with the primary content as query terms in order to locate the related content representing previous and/or subsequent episodes of the series.

Figure 5:
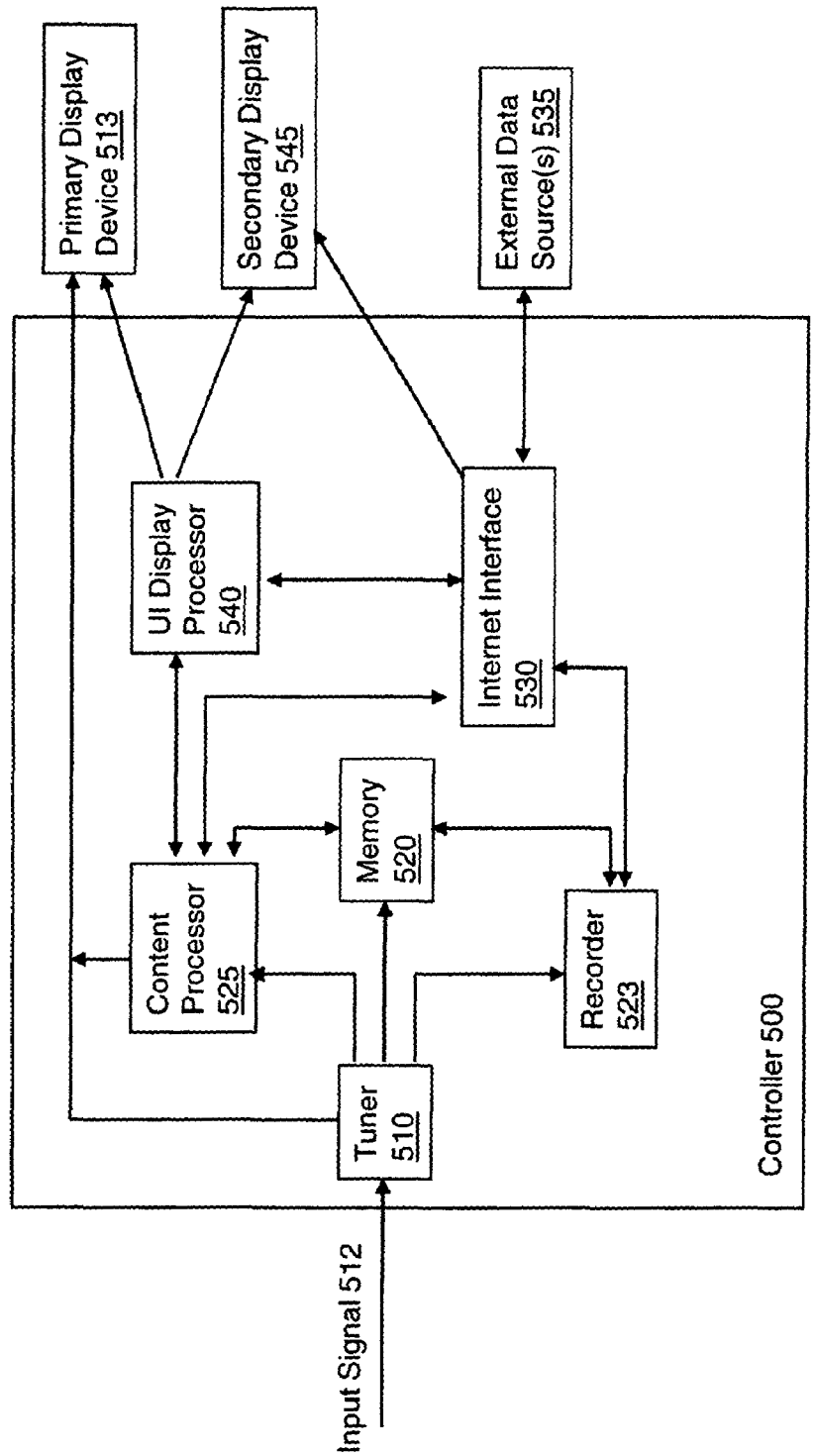
FIG. 5 is a block diagram in accordance with an aspect of an embodiment.

Thus, the tuner of the set top box 102 functions as the relevant content selection identifier which identifies data describing the currently viewed program for use as input to a related content search module executing on a content processor (as shown in FIG. 5). The set top box 102 further includes a user interface (UI) display processor module (as shown in FIG. 5) for selectively displaying the results including at least one of user selectable links corresponding to previous and/or subsequent episodes of the primary content from the related content search module on the secondary display device 108. Alternatively, the UI display module may automatically modify the user interface on the primary display device to display the results of the search that may be selectively accessed by the user. The following is an exemplary description of how a set of content related to the primary content is caused to be displayed on the secondary display device 108A and/or 108B. The following includes a description of television shows and a related content being at least one of previous and subsequent episode of the television show. However, one skilled in the art would appreciate that the system is operable to tune any television show, either broadcast live or stored on a storage medium, and acquire a set of related content associated therewith for display on the secondary display device 108A and/or 108B.

If a user has selected an episode of a television program that is part of a television series as primary content, the set top box 102 decodes the input signal and causes the episode to be displayed on primary display device 104. Upon tuning content, the set top box 102 automatically begins recording the content in a memory. The set top box 102 automatically searches for related content in the form of previous and/or subsequent episodes of the television series from a plurality of different content providers. The set top box 102 generates a user interface including the results of the search which include user selectable links enabling access to data representing a previous and/or subsequent episode of the primary content being displayed on primary display 104. The user interface is selectively accessible via a communication network 106 by pointing a web browsing application executing on secondary display devices 108A and/or 108B to an address corresponding to the set top box 102. From the user interface on secondary device 108A and/or 108B, a user can select a link corresponding to a previous episode in the series. An exemplary display of the results of this search will be described hereinafter with respect to FIG. 3. In response to this selection, set top box 102 automatically accesses the location at which the previous episode is stored and causes the episode to be displayed on the primary display 104. The set top box 102 ceases display of the primary content but maintains recording of the primary content which may be viewed later. In one embodiment, should a user tune a different program, for example on a different channel, the system automatically ceases recording of the previously tuned program and deletes the recording of the previously tuned program from the memory. Alternatively, should the user tune a different program, the set top box 102 causes a display image to be presented to the user on the primary or secondary display device requesting user input identifying whether or not the system should at least one of (a) maintain the recording of the previously tuned program; (b) keep the recording of the previously tuned program in memory; and (c) delete the recording of the previously tuned program from the memory.

Figure 2:
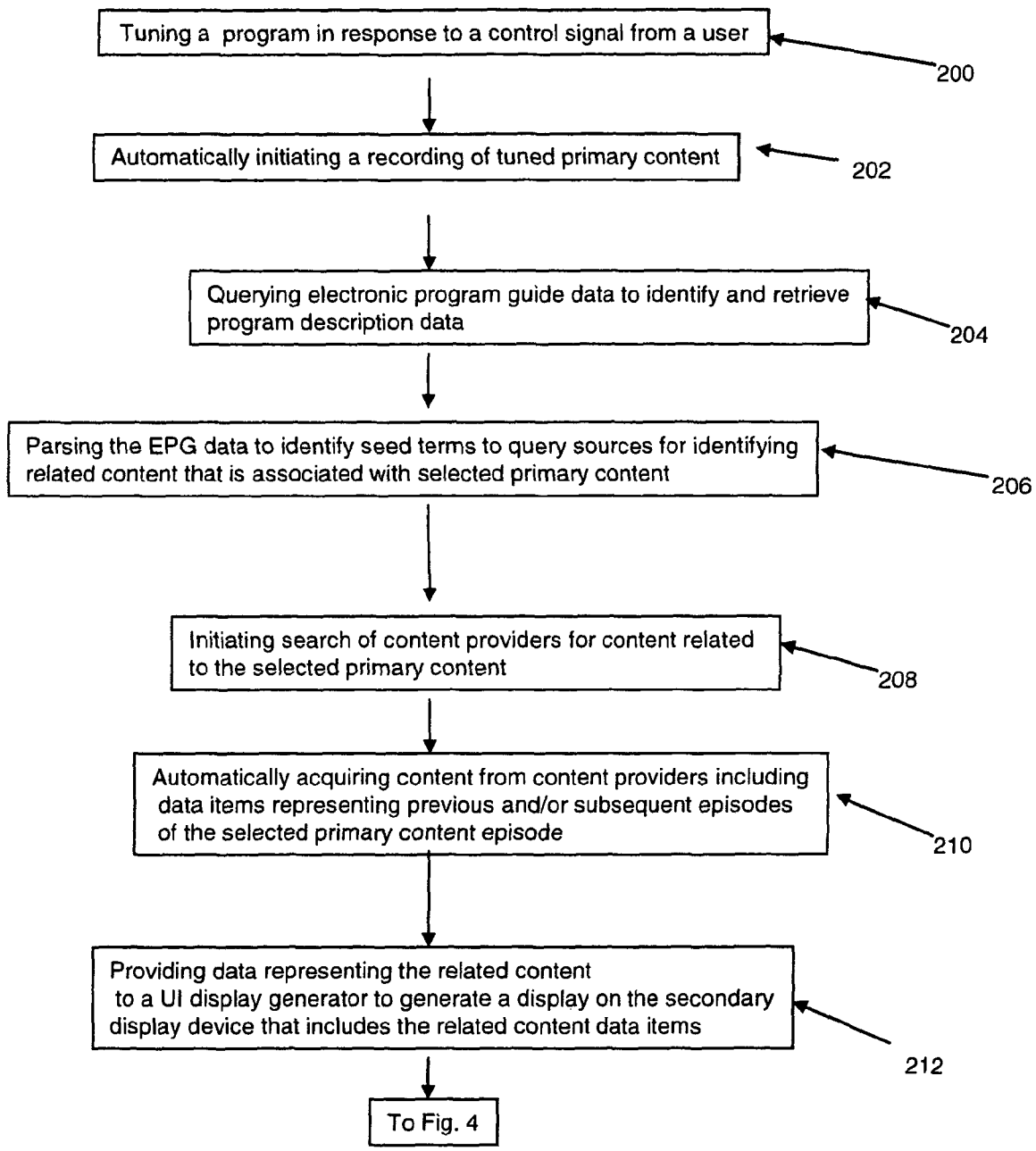
FIG. 2 is an exemplary flow diagram of a method of catch-up media content viewing in accordance with an aspect of an embodiment.

FIG. 2 is a flow diagram detailing an exemplary operation of the system described in FIG. 1. This embodiment describes a system whereby the primary content selected is an episode of serial television program tuned by the set top box 102 and the primary display device is a television 104. In step 200, a user causes a control signal to be transmitted via a remote control to set top box 102 for selecting a piece of primary content on a particular channel. In step 202, the system automatically initiates a recording of the currently tuned primary content. The data being recorded may be stored in at least one of a buffer and storage medium such as a hard disk drive. In step 204, the related content search module executing on the content processor (FIG. 5) queries electronic program guide (EPG) data to retrieve program description data including at least one of (a) series title; (b) episode titles; (c) episode position data identifying where the episode belongs; and (d) episode description data. The EPG data can be stored within the system hosting the related content search module (such as the set-top box) or externally, such as by a cable provider web service.

The related content search module executing on the content processor (FIG. 5), in step 206, parses the EPG data to identify seed terms for use in querying content provider sources that may provide access to episodes of the identified series other than the episode currently being accessed. A seed term is any description data describing primary content selected by the system from the ancillary data associated with the primary content. The related content search module may utilize a proprietary search mechanism and algorithm or may use a third party search web service such as provided by Google™ or any other internet search provider. In response to identifying seed terms, the system automatically initiates a search of a plurality of content providers to locate content providers able to provide access to previous and/or subsequent episodes of the primary content in step 208. The set of content providers may include at least one of (a) local user content (e.g., found on a home media server via UPnP on the local area network), (b) subscription services of the user (e.g., cable "On Demand" content, Netflix InstantWatch content, etc.), and (c) openly accessible Internet services (e.g., Hulu, Fancast, TV network sites, etc.).

While the search described above is performed in response to tuning a program, it should be appreciated that the system may automatically perform the search upon receipt of the EPG data for each program listed in the EPG data. In this embodiment, the system advantageously pre-searches for potential related content that a user may wish to access. When the system tunes a particular program as primary content in response to a user generated control signal, the results including the related content are able to be provided in less time than if the system had to perform a plurality of individual searches for related content upon tuning the primary content program. Thus, the searching algorithm may be automatically repeated on data item in the EPG guide to develop and create a detailed set of related content location links that may be selectively stored locally or on a remote storage device accessible via a network that can be automatically presented to the user in response to the primary content selected by the user.

In step 210, the system automatically acquires related content including data representing previous and/or subsequent episodes of the series. The step of acquiring may include downloading, from a content provider source, data in a particular data format corresponding to one or more of the previous/subsequent episodes to be stored locally on a storage medium of the set top box 102. Alternatively, the step of acquiring related content data may include acquiring and storing location information associated with related content. Location information may include any of (a) a universal resource locator (URL) pointing to an episode on a content provider site, (b) a URL pointing to a set-top box provided web service that enables On Demand content to be played back with a click, (c) a URL pointing to the local network share path where the episode is stored and may be streamed, and (d) any other identifier enabling a user to access the related content. As used herein, the term 'link' can be used to describe such information, regardless of whether the content is web-based. The link including location information may be presented to the user on at least one of the primary or secondary displays via the set top box 102 as discussed below. The system advantageously aggregates all related content including all available episodes of the television series that is selected by the set top box 102. In one embodiment, the system automatically determines an access format type to be associated with the content presented to the user. An access format type associated with the link to the related content may point the user to the full content (for free or for pay), to a preview of the content (such as a trailer), to a purchasable format (such as Amazon streaming or DVD), or to some other format including at least partial access to the related content. Alternatively, the related content search module executing on the content processor (FIG. 5) may automatically query a source of user rights information that includes a set of content providers to which the user has access. The source of rights information may be automatically populated based on subscription information associated with at least one user. Alternatively, the source of rights information may be selectively updated by the at least one user based on access rights to third party content providers. Upon querying and determining the level of access available to the at least one user, the system determines what type of access format will be associated with a respective piece of related content.

The related content search module executing on the content processor (FIG. 5) provides data representing the acquired related content including links to the related content to a UI display module executing on the set top box 102 in step 212. The UI display may be in the form of a web browser running on the second display device 108 that is pointed at a web server running on the set-top box 102. Exemplary output from step 212 which links to data representing previous episodes of a television series is shown in FIG. 3.

Figure 3:
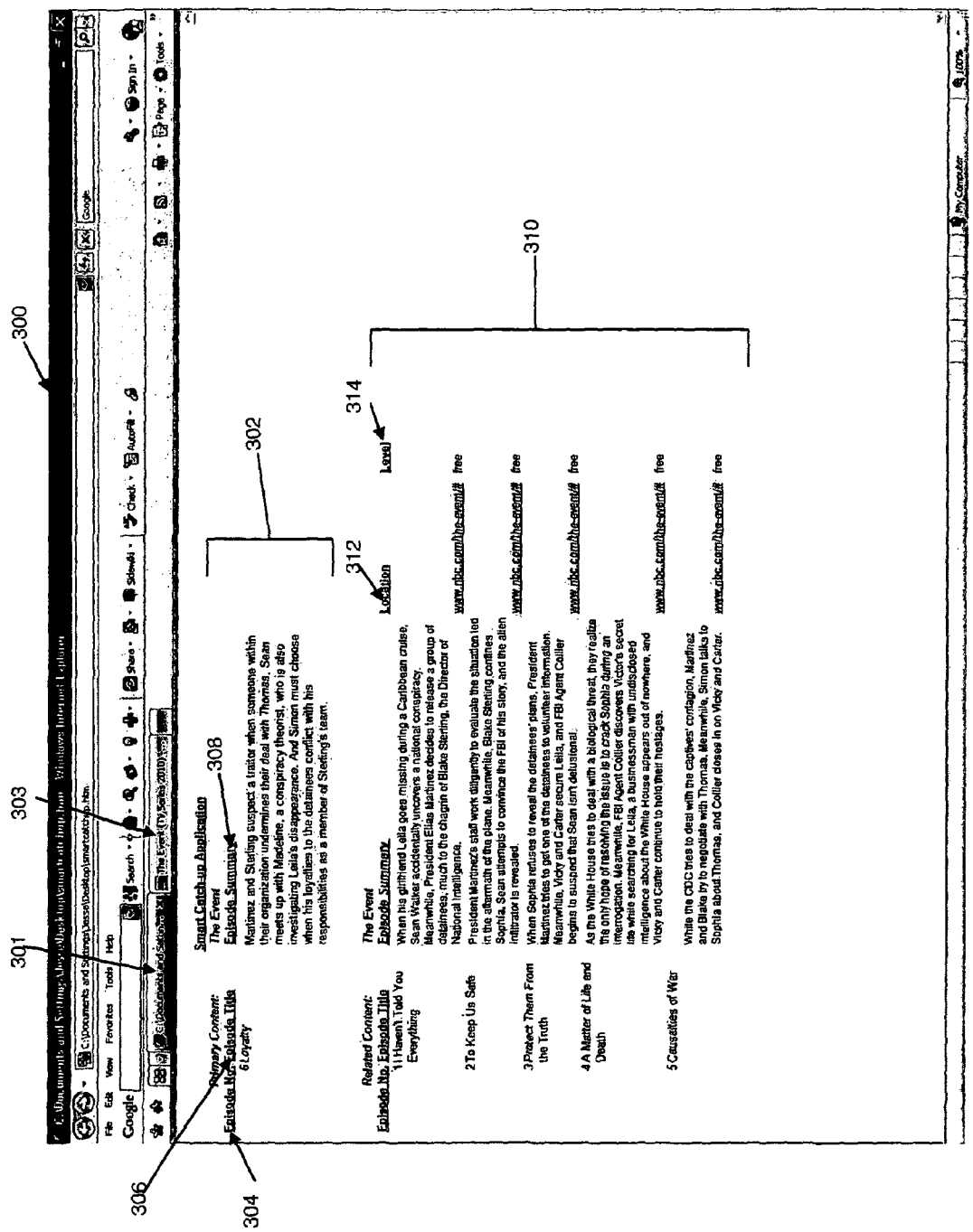
FIG. 3 is an exemplary screen shot generated by the system in accordance with an aspect of an embodiment

FIG. 3 is an exemplary screen shot of a web browsing application 300 executing on a secondary display device 108A and/or 108B (FIG. 1). The web browsing application may be a tabbed-enabled browser that enables multiple web pages to be presented in respective tabs 301 and 303. FIG. 3 depicts tab 301 in an active state and provides a tabular formatted list of content that is available to the user. The user interface generated by the set top box 102 includes a primary content section 302 that includes information describing the primary content which is currently selected for viewing by the set top box 102. Primary content section 302 includes a plurality of data fields 304, 306, 308 in respective columns that provide additional information about the primary content. For example field 304 includes information identifying an episode number in the series. Additionally, episode information field may also include information identifying a season in which the episode was broadcast. Field 306 includes episode title information and field 308 includes episode summary information. The fields including the aforementioned information describing the primary content are provided for example only and the user interface generated may include any number of fields including any information describing the primary content. Alternatively, the type and number of description fields may be configurable by the user and based on any of the characteristic data or other metadata associated with the primary content.

A related content section 310 is further provided as part of the user interface. Data items representing related content in the form of at least one previous or subsequent episode of the currently selected primary content are presented to the user in a plurality of rows. A respective row corresponds to a respective one of the at least one previous or subsequent episodes. The related content information similarly includes fields 304, 306 and 308 contained in individual columns and displaying similar data as described above with respect to the primary content section 302. Related content section 310 may also include additional fields 312 and 314 in respective columns. Data field 312 includes location data identifying a location at which the respective episode can be accessed. Data field 314 includes access level information identifying what level of access is required of a user in order to obtain access to the content at the specified location. Examples of access levels include but are not limited to at least one of (a) free; (b) pay-per episode and (c) available as part of a subscription. The access level information is specific to the registered user of either or both the set top box 102 and the secondary display device 108A and/or 108B. Information displayed in the level field 314 is checked using an authentication/authorization module to determine what, if any, access a particular user has to a respective content provider and displayed in accordance with the determination made by the authentication module. While only a single location having a single access level is shown in the respective rows in the secondary content section 310, it should be appreciated that, in response to the search for related content, a respective episode may be available from a plurality of different content providers which would result in the location field 312 having a plurality of location identifiers listed and the level field 314 having a plurality of different access levels corresponding to the respective content providers. This advantageously enables the user to obtain access to the related content from a preferred content provider. In another embodiment, the related content section may omit the location field 312 and, instead, have a data item in any other field 304, 306, 308, 314 as a user selectable link that corresponds to the location information of the related content. In yet another embodiment, when there are a plurality of content provider sites that have the related content, a user selectable icon identifying the content provider may be presented in a data field enabling a user to access the related content by selecting the respective provider icon.

The user interface shown in FIG. 3 is merely exemplary in both format and style. The set top box 102 may be configured to generate and format a user interface for display on a secondary device in any format and style so long as the data items displayed therein enable a user to access related content including previous or subsequent episodes of the currently selected primary content. For example, in another embodiment, when a viewer watches an episode of a series, he is presented with a list of previously shown episodes on a primary and/or secondary screen. This list can be sorted in different ways and/or episodes can be highlighted and marked based on different criteria—for example:

1. Previous episodes that have been watched or not watched (personalization)
2. Episode is available for on-demand watching (managed network)
3. Episode is available for free from a 'cloud provider' (Hulu, Fancast, etc.)
4. Episode (or season) is available through a paid service (Netflix, Amazon, etc.)

In addition, the listing of episodes may provide additional information, such as, for example, synopsis and/or other important story features to bring the viewer up to the current episode. The viewer can then choose to watch the current episode and/or, if available, record the current episode and switch to one selected from the list as will be discussed with respect to FIG. 4.

Figure 4:
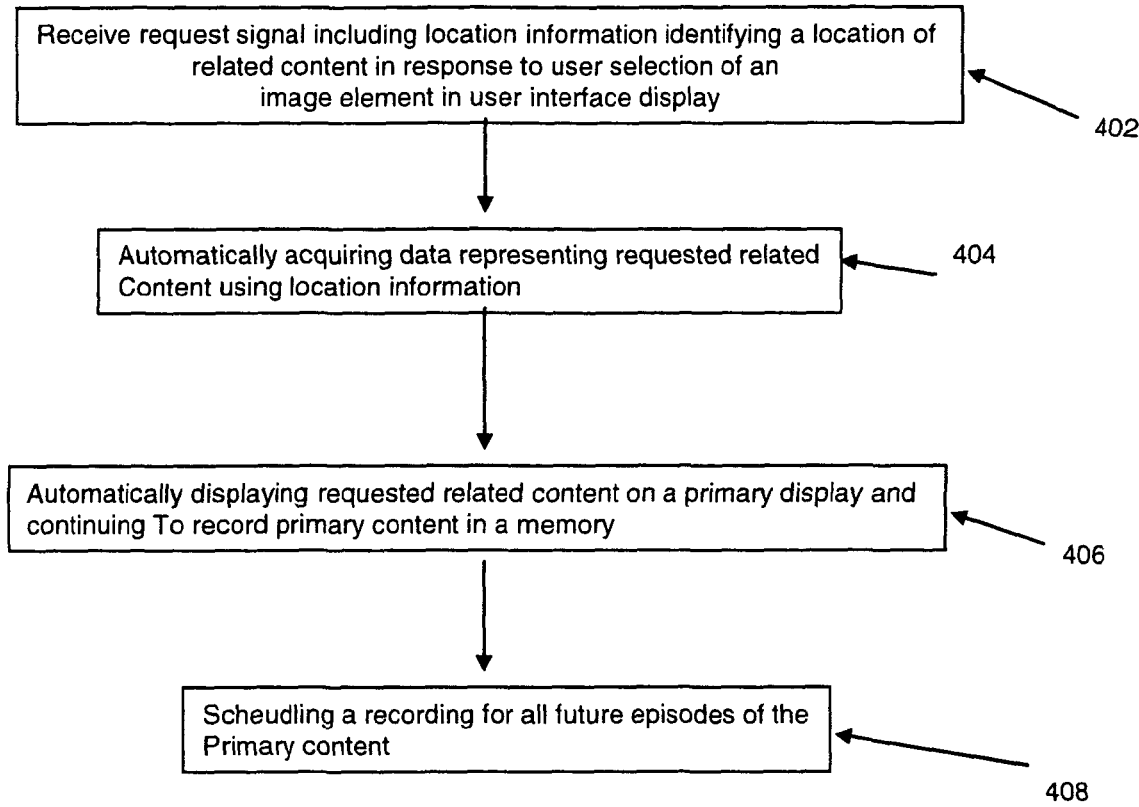
FIG. 4 is an exemplary flow diagram of an algorithm controlling an aspect of system operation in accordance with an aspect of an embodiment.

FIG. 4 is a flow diagram detailing an exemplary operation of the system continuing from step 212 in FIG. 2. In response to the presentation of the user interface shown in FIG. 3, a user may select a respective episode of the series that is an earlier position than the currently accessed primary content. In step 402, a request signal corresponding to a user selected piece of related content is received by the set top box 102 (FIG. 1). The request signal includes location information identifying a location on a communication network at which the requested related content is stored. For example, the location information may include a URL of a content provider that is hosting the episode for display such as www.hulu.com. However, any identifier of any type for the respective content provider may be included in the request signal. It should be noted that the above hyperlink and any subsequent hyperlinks are used for purposes of example only. These hyperlinks may or may not be active and may or may not contain data. Any data stored at the location corresponding to any hyperlink is not required for an understanding of the present invention. In step 404, the set top box 102 accesses the related content using the location data and acquires the related content to be displayed to the requesting user. In step 406, the acquired requested content is automatically caused to be displayed on the primary display device 104 while the primary content continues to be recorded on a storage medium for later access by a user. In step 408, the system automatically schedules recording of all future episodes of the primary selected content to ensure the user does not miss the remainder of the series. Thus, the system advantageously enables the user to catch up on previous episodes of a series no matter what point in time the user discovers or expresses an interest in the series. The user can access the previous episodes at their leisure to ensure they have all relevant information concerning the content series and be sure not to miss future episodes during the catch-up period due to the automatic recording scheduled by the system.

The system further advantageously enables users to access content when they learn of the series at a midway point to catch up on episodes prior to the access point and those that have occurred since. For example, if a current broadcast television series is in the middle of a fifth season and a user comes across the third episode of the television series in the third season where the series is syndicated, the system automatically acquires data representing all available episodes prior to third episode of the third season as well as all available episodes from the third season up through the current point in the fifth season. Data items corresponding to the location of these episodes would be presented to a user in an exemplary user interface such as the one shown in FIG. 3.

FIG. 5 is a block diagram of an exemplary controller 500 that implements the system described above with respect to FIGS. 1-4. The controller 500 may be a hardware component embodied in a set top box 102 as shown in FIG. 1. The controller 500 includes a tuner 510 that selectively receives and tunes an input signal 512. The input signal may be a television broadcast signal formatted in a particular signal format such as those set forth by the Motion Pictures Experts Group (MPEG) or any other signal format used for encoding and transmitting audiovisual data and ancillary data associated with the audiovisual data. The tuner 510 tunes a desired program from the input signal 512 for display on a primary display device 513 in response to a control signal. Any ancillary data accompanying the tuned input signal 512 is decoded and stored in a memory 520. The ancillary data may include Electronic Program Guide (EPG) data or any other data encoded and transmitted with the input signal 512.

A recorder 523 is coupled between the tuner 510 and the memory 520. In response to tuning a desired program in response to the control signal, recorder 523 automatically initiates a recording of the currently tuned program in memory 520. The recording initiated by recorder 523 may occur immediately upon tuning of the desired program. Alternatively, the recording may be initiated after a predetermined amount of time the tuned program is actively being displayed on the primary display device 513. In this instance, beginning the recording after a predetermined time period enables the system to identify that the tuned program is one on which the user is interested in obtaining additional information. When the set top box determines that there are other episodes available the user has not yet seen, the system starts recording of the primary content episode immediately. This occurs before the user has made a decision whether to keep watching or switch to a previous episode. Therefore, if the user decides to watch an older episode first, he can come back to the current episode at a later time. If the user decides to continue watching the current episode, the recording is automatically deleted, unless the user actively chooses to record or keep the recording.

The controller 500 further includes a content processor 525 coupled to both the tuner 510 and the memory 520. The content processor 525 identifies the program and/or channel tuned by tuner 510 in order to assign the tuned content as the primary content. The content processor 525 queries the EPG or other associated data stored in the memory 520 to identify characteristics that describe the primary content which may be used to search additional sources for related content information and for sources where related content is stored. If the primary content includes an episode of content that is part of a series of episodes. The related content information includes data representing at least one episode of the series that is positioned prior to the primary content episode within the series timeline. Related content information may also include data representing episode(s) of the series that is positioned after the primary content episode within the series timeline, if available. Data representing the characteristics describing the primary content may be used as search terms in a searching algorithm to locate the data representing the related content. Characteristic data may include at least one of (a) series title; (b) episode title; (c) episode number; (d) position of episode within the series; (e) season number; (f) information associated with the plot line of the episode, series or season; and (g) information identifying characters appearing in the episode or relevant plotline covered by the episode.

In another embodiment, the characteristic data may include data that is marked by the content provider or content creator that indicates that a particular previous and/or subsequent episodes of the series is important to understand the primary content episode currently being accessed. The provider marked characteristic data may be used by the system to search for and acquire targeted related content data that corresponds to the marked characteristics thereby providing a user with a subset of related content data including only the previous episodes that relate to a particular element of the primary content for accessing by a user. For example, if the primary content episode covers a particular plot line, the content provider may transmit metadata with the input signal that corresponds to terms contained in the description information of previously aired episodes. This enables a targeted search of prior episodes that are part of the same plot line. By accessing prior episodes the system advantageously improve the user's understanding of the primary content. Additionally, characteristic data may include timestamp data that correlates with segments of previous episodes that relate to an element of the primary content. The system may acquire a subset of episode data comprising a segment of a previous episode that is related to the primary content and present these subsets of episode data for viewing by the user. This advantageously reduces an amount of time that the user needs to spend viewing previous episode data in order to understand the primary content that is currently being accessed by the user. Alternatively, using the time stamp data identifying relevant parts of previous episodes, the content processor 525 can automatically vary the playback speed of portions of the selected previous episode that are outside the timestamp range. This may further advantageously reduce an amount of time a user must spend accessing previous content while still providing the user with enough information to understand and enjoy the primary content.

Content processor 525 may use a related content search module to automatically initiate a related content search algorithm that initiates a search across at least one of a local and wide area network for related content data. The related content search algorithm executed by the content processor 525 engages an internet interface 530 which is coupled thereto to initiate a search of external data sources 535 using the characteristic data identified by the content processor 525. The system searches the at least one external data source 535 for a source file of the content corresponding to previous or subsequent episodes of the primary content. As used herein, external data source 535 is a generic term used to denote any source of data for any purpose. For example, external data source 535 may be a content provider (i.e. Netflix, Fancast-.com, HULU, OnDemand, iTunes Store or a local user data store). Upon performing the search for content, content processor 525 obtains the results including the location of the related content. Additionally, the related content search algorithm acquires description data describing the related content uncovered by the search. The related content search algorithm also acquires access level information associated with the related content. The access level information is specific to respective content providers and identifies a level necessary for a user to access the related content. Access level information may include data identifying the content as (a) freely available; (b) fee based access and (c) accessible only via a subscription arrangement between the user and the content provider. Access type information may also be acquired as part of the related content search algorithm. Access type information includes data identifying what type of access the user has to the content. Access type information includes data indicating that the related content is at least one of (a) fully accessible; (b) less than fully accessible; (c) accessible at full quality; (d) accessible at less than full quality and (e) accessible on a particular device.

Content processor 525 uses the related content search module to automatically provide data representing the related content including the location data and description data to a user interface (UI) display processor 540. UI display processor 540 automatically formats the related content data according to a predetermined format and generates links enabling access to the related content data. UI display processor 540 causes the user interface including the related content information to be displayed on a secondary display device 545 which is separate and different from the primary display device 513. In one embodiment, the UI display processor 540 may provide the formatted user interface to the internet interface 530 which functions as a webserver and allows a browser executing on the secondary device 545 to be pointed to a hosted user interface allowing user access thereto. Once presented on the secondary device 545, a user may browse and navigate the data items on the related content list in order to select other episodes that occurred either earlier or later in the series timeline than the one currently being displayed on primary display device 513. Alternatively, in the instance when no secondary device 545 is presently connected to the set top box, the UI display processor may generate a related content indicator and cause the related content indicator to be displayed on the primary display device 513. The related content indicator may be a flashing icon displayed at a position on the first display device 513 during the display of the primary content. The controller 500 may selectively provide access to the list of related content in response to receipt of an access control signal generated by a user pressing a button on a remote control, for example. Alternatively, if the user is viewing the EPG on the primary display, a dedicated area of the EPG display may include the related content indicator that may be selected by a user to access the related content data.

In an embodiment, the data items presented within the user interface generated by UI display processor 540 may include episode synopsis information, series synopsis information, a date on which the original episodes were broadcasted and dates on which future episodes will be aired. This additional information may be automatically acquired by a content information search algorithm that engages the internet interface 530 to search external data sources (e.g. Wikipedia and IMDB) for information describing the related content. Once acquired, the content information data may be provided to UI display processor 540 which formats the content information for presentation within the user interface.

In another embodiment, content processor 525 and UI display processor 540 operate together to execute a personalization algorithm that personalizes the user interface generated by UI display processor 540 that is presented to a user on at least one of secondary device or the primary device 513. According to one aspect, content processor 525 automatically marks episodes of related content that were viewed by a user. The data representing these marks and the episodes of related content which they are associated with are provided to UI display processor 540 which automatically modifies the user interface presented to the user with an indicator (e.g. highlighting or a check mark) adjacent the marked related content. The marks associated with related content may also be used as filters that enable the user to modify the UI by preventing display of marked items or displaying only marked items.

The internet interface 530 may receive a request signal corresponding to related content displayed by user interface display processor 540 on secondary display device 545. The request signal is generated in response to user selection of a link within the user interface that is associated with related content. The request signal includes location information directing the internet interface to a location on a communication network at which the related content may be found. The request signal may also include access level data identifying a level required to be met by a user to access the data and access type information identifying the type of access available for the requested related content. The request signal is provided to the content processor 525 to identify the desired related content being requested. Content processor 525 parses the request signal and engages internet interface 530 to acquire the content using the location information in the request signal. The related content acquired via internet interface 530 is caused to be displayed by content processor 525 on primary display 513. At this time, the primary content on which the related content search was based ceases to be displayed. However, recorder 523 continues to record the primary content in memory 520 in order to facilitate later access thereof. Additionally, in response to acquiring related content, recorder 523 schedules a recording of all future episodes of the primary content thereby ensuring that the user will not miss any future episodes of the series while the user may be catching up on past episodes listed in the related content user interface on secondary display device.

Additionally, in response to receipt of the request signal, the system may execute an authorization algorithm to determine if the user is authorized to access the requested related content. Content processor 525 parses the request signal to identify the access level information and the access type information. Content processor 525 may compare at least one of the access level information and the access type information to a source of user authentication information to determine if and what type of access the user may be provided to the requested related content. User authentication information may be pre-stored in memory 520 or provided by a user in response to a request initiated by at least one of the system or a content provider. User authentication information may include information indicating various content providers to which the user may have access and what type of access the user is granted by each respective content provider. Depending on the current subscription status of a user and the capabilities of the selected playback device, the content processor 525 may provide data instructing the UI display processor 540 to mark an episode with colors and/or symbols according to the available sources. Based on some options by the user, the default source can be picked automatically with the best quality available. Additional related content that is available from a content provider but which the user is not authorized to access may be indicated as such in the UI presented to the user. In addition, the content provider and/or content creator may offer additional paid or free services the user has not subscribed to by displaying a subscription information message within the user interface.

Based on the access type information set by the content provider and contained in the request signal, the system automatically presents the selected related content at a quality level that is ideal for the device on which the related content is being accessed. Thus, the system automatically determines the ideal access quality based on at least one of system components, network capabilities and device playback capabilities. Additionally, content providers may make content available at a lower quality (e.g. standard definition) for free but require additional fees or subscription for higher quality content. In this arrangement, an indicator identifying the quality of the related content may be shown in the user interface along with a user selectable element enabling a user to take any necessary steps to access the content at the higher quality.

In one embodiment, the system described in FIG. 5 automatically performs the related content provider search for every program identified in the EPG data stored in memory 520 upon receipt of the EPG. The automatic search advantageously enables the system to populate a database with related content information at predetermined intervals when network/viewing activity is reduced. The system may then initiate and perform the above search algorithms on the data in the database when the user selects the primary content thereby reducing the amount of time required to provide the user with the set of related content.

In another embodiment, the system may be embodied in a server responsible for serving a set of users. In this embodiment, the server executes the search algorithms described above to populate the database and provides users access to the database to reduce the bandwidth and processing power needed to perform a full search of all of the possible content information and content provider sources. In response to selection of primary content, the set top box may automatically execute an application that initiates the content information and content provider search in the database of the server for related content thus reducing the amount of processing power, bandwidth and time required to provide the user with a set of enhanced content information.

Figure 6:
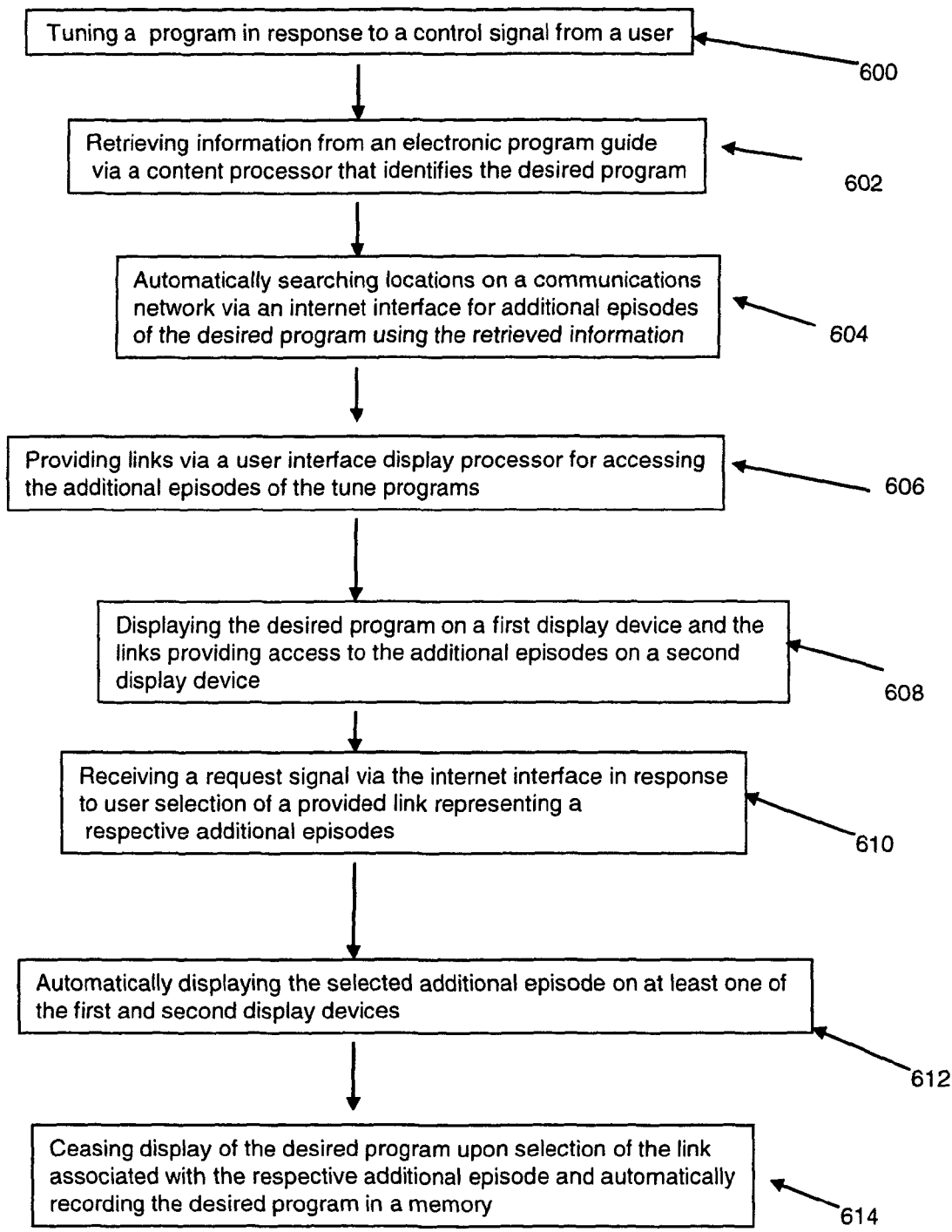
FIG. 6 is an exemplary flow diagram of an algorithm controlling another aspect of system operation in accordance with an aspect of an embodiment.

FIG. 6 is an exemplary flow diagram detailing an aspect of operation of the system described above. The system executes a method of providing access to related content. In step 600, a display is tuned to a desired program and information that identifies the desired program is retrieved from an electronic program guide using a content processor 525 in step 602. A plurality of locations on a communication network are automatically searched for additional episodes of the desired program using the retrieved information via an internet interface in step 604. In one embodiment, the step of searching may include at least one of (a) acquiring location information associated with respective additional episodes identifying a location on a communication network at which the respective additional episodes are stored; (b) accessing level information identifying a level of access available to respective additional episode; and (c) accessing type information indentifying a type of access to the additional episode that may be provide to a requesting user. Links for accessing the additional episodes of the tuned program are provided via a user interface display processor 540 in step 606. In step 608, the desired program is displayed on a first display device and the links providing access to the additional episodes are displayed on a second display device. In step 610, a request signal is received via the internet interface in response to user selection of a provided link representing a respective additional episode. The selected additional episode is automatically displayed on at least one of the first and second displays in step 612. In step 614, display of the desired program is ceased upon selection of the link associated with the respective additional episode and a recording of the desired program in a memory is automatically initiated.

The implementations described herein may be implemented in, for example, a method or process, an apparatus, or a combination of hardware and software. Even if only discussed in the context of a single form of implementation (for example, discussed only as a method), the implementation of features discussed may also be implemented in other forms (for example, a hardware apparatus, hardware and software apparatus, or a computer-readable media). An apparatus may be implemented in, for example, appropriate hardware, software, and firmware. The methods may be implemented in, for example, an apparatus such as, for example, a processor, which refers to any processing device, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Additionally, the methods may be implemented by instructions being performed by a processor, and such instructions may be stored on a processor or computer-readable media such as, for example, an integrated circuit, a software carrier or other storage device such as, for example, a hard disk, a compact diskette, a random access memory ("RAM"), a read-only memory ("ROM") or any other magnetic, optical, or solid state media. The instructions may form an application program tangibly embodied on a computer-readable medium such as any of the media listed above. As should be clear, a processor may include, as part of the processor unit, a computer-readable media having, for example, instructions for carrying out a process. The instructions, corresponding to the method of the present invention, when executed, can transform a general purpose computer into a specific machine that performs the methods of the present invention.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method of providing access to related content comprising the activities of:
    tuning a receiver to a desired program, the desired program displayed on a primary display device;
    retrieving information via content processor that identifies the desired program from an electronic program guide;
    parsing the retrieved information from the electronic program guide to identify seed terms to generate an internet search for additional episodes of the desired program, the seed terms generated from characteristic data including metadata marked by a content provider or content creator, the marked metadata indicating that a particular additional episode of the desired program is important to understand the desired program;
    automatically searching locations on a communication network, via an internet interface, for the additional episodes of the desired program using the seed terms of the retrieved information; and
    providing links corresponding to the additional episodes, via a user interface display processor, the provided links displayable on a secondary display device, the secondary display device having a browser pointed to a web-server of the internet interface, the provided links enabling access to the additional episodes of the desired program.

2. The method of claim 1, further comprising
    receiving a request signal via the internet interface in response to user selection of a provided link representing a respective additional episode, and
    automatically displaying the selected additional episode on at least one of the first and second displays.

3. The method of claim 1, further comprising
    ceasing display of the desired program upon selection of a link associated with a respective additional episode, and
    automatically recording the desired program in a memory.

4. The method of claim 1, further comprising the activity of acquiring location information associated with respective additional episodes identifying a location on a communication network at which the respective additional episodes are stored.

5. The method of claim 1, further comprising the activity of acquiring at least one of (a) access level information identifying a level of access available to respective additional episode and (b) access type information indentifying a type of access to the additional episode that may be provide to a requesting user.

6. The method of claim 1, further comprising the activity of acquiring description data associated with each of the desired program and respective additional episodes of the desired program; and
    providing the acquired description data to the user interface display processor and generating the links to respective additional episodes and including the description data associated with the respective additional episodes.

7. The method of claim 2, further comprising the activity of automatically scheduling a recording of a series to which the desired program belongs in response to receipt of the request signal requesting a respective additional episode.

8. A system for providing access to related content comprising:
    a tuner that tunes a receiver connected to a primary display device to a desired program;
    a content processor coupled to the tuner that retrieves information identifying the desired program from an electronic program guide, the content processor parsing the retrieved information from the electronic program guide to identify seed terms to generate an internet search for additional episodes of the desired program, the seed terms generated from characteristic data including metadata marked by a content provider or content creator, the marked metadata indicating that a particular additional episode of the desired program is important to understand the desired program;
    an internet interface that automatically searches locations on a communication network for the additional episodes of the desired program using the seed terms of the retrieved information; and a user interface display processor that provides links to a secondary display device via a webserver of the internet interface, the links enabling a user to access the additional episodes of the tuned program.

9. The system of claim 8, wherein
said internet interface receives a request signal in response to user selection of a provided link representing a respective additional episode, and
said content processor automatically displays the selected additional episode on at least one of the first and second displays.

10. The system of claim 8, wherein
said tuner ceases to display the desired program upon selection of the link associated with the respective additional episode, and further comprising
a recorder coupled to the tuner that automatically records the desired program in a memory.

11. The system of claim 8, wherein
said content processor acquires location information associated with respective additional episodes identifying a location on a communication network at which the respective additional episodes are stored.

12. The system of claim 8, wherein
said content processor acquires at least one of (a) access level information identifying a level of access available to respective additional episode and (b) access type information indentifying a type of access to the additional episode that may be provide to a requesting user.

13. The system of claim 8, wherein said content processor acquires description data associated with each of the desired program and respective additional episodes of the desired program and provides the acquired description data to the user interface display processor to generate the the links to respective additional episodes and including the description data associated with the respective additional episodes.

14. The method of claim 9, wherein said content processor signals said recorder to automatically schedule a recording of a series to which the desired program belongs in response to receipt of the request signal requesting a respective additional episode.

* * * * *